April 10, 1928.
G. T. JOHNSON
1,665,414
SIX-WHEEL CAR TRUCK CONSTRUCTION
Filed Feb. 10, 1927    2 Sheets-Sheet 1
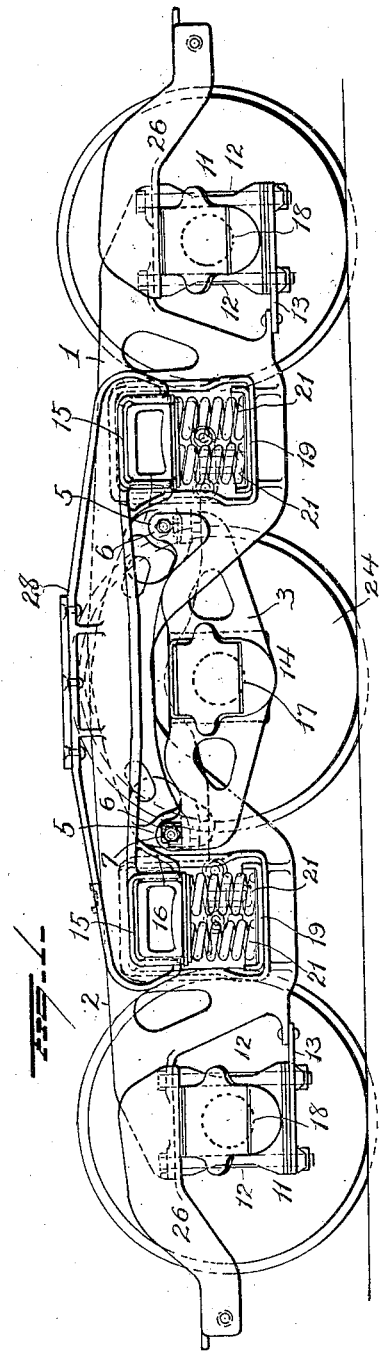
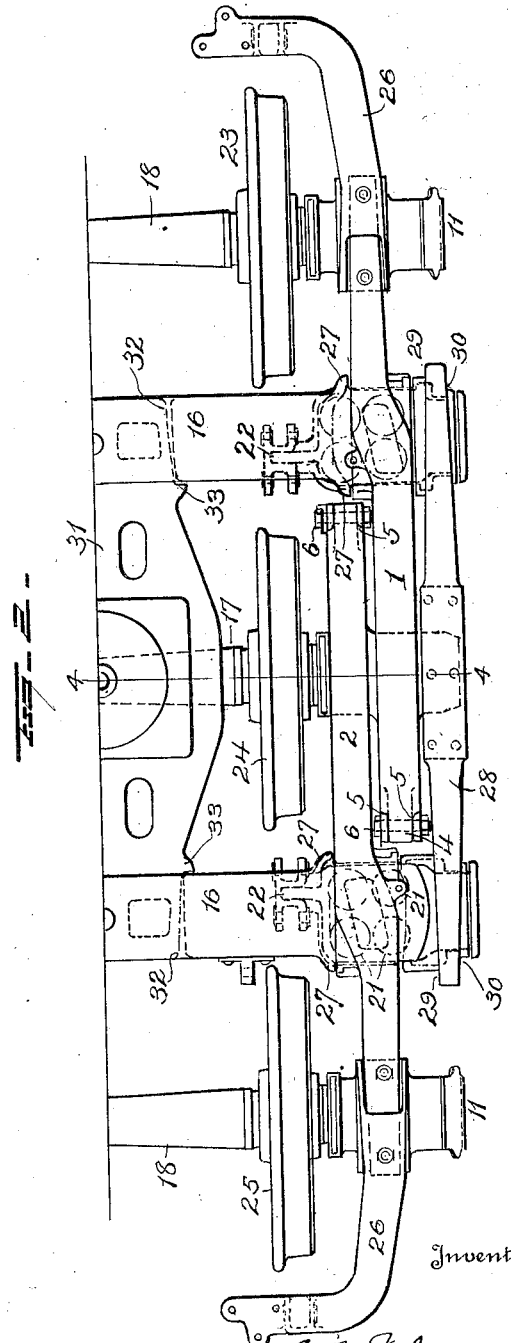
Inventor
G. T. Johnson
By Seymour & Bright
Attorneys

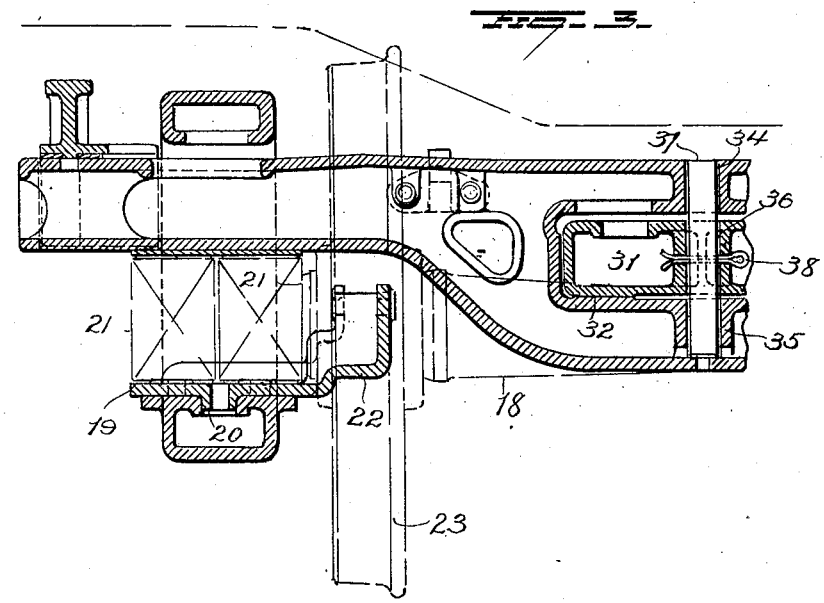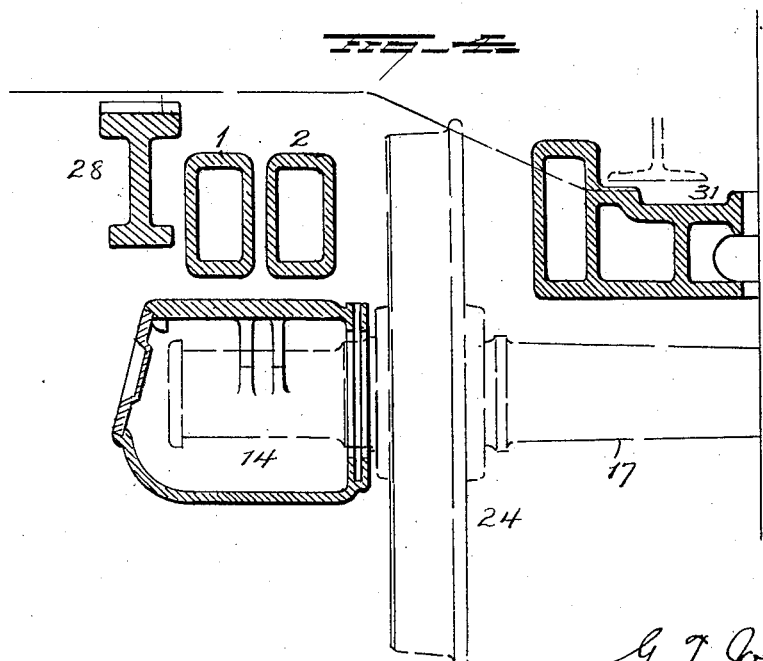

Patented Apr. 10, 1928.

1,665,414

UNITED STATES PATENT OFFICE.

GEORGE T. JOHNSON, OF COLUMBUS, OHIO, ASSIGNOR TO THE BUCKEYE STEEL CASTINGS COMPANY, OF COLUMBUS, OHIO.

SIX-WHEEL CAR-TRUCK CONSTRUCTION.

Application filed February 10, 1927. Serial No. 167,279.

This invention relates to improvements in six wheel car truck constructions and contemplates side-frames, each comprising equalizing end members and a central equalizing member flexibly connected at its ends with inner end portions of the end members, said truck also comprising transverse bolsters mounted in side frames and connected by bridge bars, and a longitudinal bolster between the transverse bolsters and having key connection therewith, said longitudinal bolster also having lateral lugs to engage the transverse bolsters.

In the accompanying drawings,—

Figure 1 is a side elevation of a six wheel truck embodying the improvements;

Figure 2 is a partial plan view,

Figure 3 is a fragmentary sectional view, and

Figure 4 is a section on line 4—4 of Figure 2.

In the drawings, only one side frame construction is shown but it will be understood that two such constructions are employed, one at each side of the truck. The side frames each comprises three members; two equalizing end members 1 and 2 and intermediate or central equalizing member 3 with the ends of which latter the inner ends of the end members 1 and 2 are flexibly connected,—the end members being so formed that their inner end portions will be disposed parallel with each other as shown in Figure 2 and connected respectively with the far ends of the central or equalizing member 3. The inner end of each end member 1 and 2 is contracted in width as at 4 and enters between upwardly projecting flanges 5 on the central member 3. A bolt 6 passes transversely through the flanges 5 and freely through a transverse hole 7 in the end member 1 (or 2).

Journal boxes 11 are secured by means of bolts 12 and plates 13 to the respective members of the side frame as shown in Figure 1 and the central equalizing member is provided with an integral axle box construction 14. Each of the end members 1 and 2 of the side frame is provided with a bolster opening 15 which receives the end portion of a bolster 16, the latter being located at respective sides and spaced from the central axle 17, the latter being mounted in the axle boxes of the central or equalizing member 3 while the axles 18, 18 at the ends of the truck being mounted in the axle boxes secured to the end members 1—2 of the respective side frames. Spring seats 19—19 are located in the openings in the members 1 and 2 and interlockingly engaged with the latter as at 20. Between these seats and the transverse bolsters 16, springs 21 are disposed. Each of the spring seats 19 is provided with an inwardly projecting bracket 22 adapted for the reception and support of a brake hanger, said brackets being located intermediate of the wheels 23—24—25. Located upon and having interlocking connection with the ends of the members 1 and 2 which project over the axle boxes carried by said members, are forwardly projecting brackets 26, the latter being secured in place by the same bolts which secure the axle boxes to said members 1 and 2. The outer ends of the brackets 26 are made to project inwardly and constitute brackets for outer brake hangers.

The transverse bolsters 16 are provided with lugs 27 which engage the inner sides of the side frame members 1—2 respectively and the outer projecting ends of the transverse bolsters are connected adjacent each side frame by a bridge bar 28, the latter constituting guide means for the side frames and the transverse bolsters and the latter having guides 29—30 for the bridge bar to maintain proper alignment of the latter.

A longitudinal bolster 31 is disposed intermediate the transverse bolsters and is provided at its respective ends with reduced portions 32 which enter the transverse bolsters and said longitudinal bolster is formed with shoulders 33 to engage the transverse bolsters and maintain them in proper positions. The upper and lower portions of each transverse bolster are provided with aligning openings 34—35 and the longitudinal bolster is provided with an opening 36 which aligns with the openings 34—35 and through said openings a vertical pin or key 37 is passed and secured against displacement by means of a cotter 38. By thus keying the longitudinal bolster at the ends thereof to the transverse bolsters, spaced relation between the transverse bolsters will be insured.

I do not, in this application, claim the specific features of the connections between the equalizer members nor the brake hanger bracket arrangements, such features being comprehended by copending application filed by J. C. Larsen and C. L. Orr, February 10th, 1927, and designated by Serial No. 167,316.

Having fully described my invention what I claim as new and desire to secure by Letters-Patent, is:—

1. A car truck comprising side frames, two transverse bolsters mounted in the side frames, and a longitudinal bolster mounted within the transverse bolsters and having a key connection at its end portions therewith.

2. A car truck comprising side frames, two transverse bolsters mounted in the side frames, and a longitudinal bolster between the transverse bolsters and having a key connection at its end portions therewith, said longitudinal bolster having lugs to engage the transverse bolster.

3. A car truck comprising side frames, two transverse bolsters mounted in the side frames, a longitudinal bolster having end portions entering the transverse bolsters, and vertical pins keying the longitudinal bolster to the transverse bolsters.

4. A car truck comprising side frames, two transverse bolsters mounted in the side frames, a longitudinal bolster having end portions entering the transverse bolsters, vertical pins keying the longitudinal bolster to the transverse bolsters, and means to prevent displacement of the vertical pins.

5. A car truck comprising side frames, a longitudinal bolster having narrowed ends, transverse bolsters mounted in the side frames and having openings receiving the narrowed ends of the longitudinal bolster, said parts having aligned holes, and vertical keys passing through the aligned holes in the longitudinal and transverse bolsters.

6. A car truck comprising transverse bolsters mounted in side frame portions, a longitudinal bolster supported at its ends by the transverse bolster and having lateral lugs abutting the inner sides of the latter and a vertical member keying the end portions of the longitudinal bolster to the transverse bolsters.

7. A six wheel car truck including equalizing side frames, transverse bolsters, a longitudinal bolster, key means interlocking the longitudinal and transverse bolsters, side bearing bridge bars engaged over the ends of the transverse bolsters and constituting guides for the side frames, and guides on the transverse bolsters for the bridge bar and maintaining alignment of the latter.

8. A six wheel car truck including side frames composed of a center member and two end members each end member extending over the center member and flexibly connected to the same at the far side thereof, transverse bolsters mounted in end members, a longitudinal bolster supported at its ends by the transverse bolsters and having lateral lugs abutting the inner sides of the transverse bolsters and a vertical member keying end portions of the longitudinal bolster to the transverse bolsters.

9. A six wheel truck having side frames each comprising two end members provided with bolster openings and a central member having integral axle box, transverse bolsters mounted in the bolster openings, a bridge engaging the ends of the transverse bolsters, each end of the bridge being provided with depending jaws engaging between the side frame and outer end guides of the bolster whereby to maintain the alinement of the bridge, a longitudinal bolster supported at its ends by the transverse bolsters said longitudinal bolster having lateral lugs abutting the inner sides of the transverse bolsters and a vertical member keying the end portions to the transverse bolsters.

In testimony whereof, I have signed this specification.

GEORGE T. JOHNSON.